(12) United States Patent
Adcock et al.

(10) Patent No.: US 9,276,278 B2
(45) Date of Patent: Mar. 1, 2016

(54) HYDROGEN PRODUCING FUEL CARTRIDGE

(71) Applicant: Intelligent Energy Inc., San Jose, CA (US)

(72) Inventors: Paul Adcock, Loughborough (GB); Anand Chellappa, San Jose, CA (US); Peter David Hood, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 14/521,084

(22) Filed: Oct. 22, 2014

(65) Prior Publication Data

US 2015/0044108 A1    Feb. 12, 2015

Related U.S. Application Data

(63) Continuation of application No. PCT/US2013/030263, filed on Mar. 11, 2013.

(60) Provisional application No. 61/615,077, filed on Mar. 23, 2012.

(51) Int. Cl.
| | |
|---|---|
| *B01J 7/00* | (2006.01) |
| *H01M 8/06* | (2006.01) |
| *C01B 3/04* | (2006.01) |
| *H01M 8/04* | (2006.01) |

(52) U.S. Cl.
CPC ............... *H01M 8/0606* (2013.01); *C01B 3/04* (2013.01); *H01M 8/04201* (2013.01); *H01M 8/04208* (2013.01); *Y02E 60/364* (2013.01); *Y02E 60/50* (2013.01)

(58) Field of Classification Search
CPC ... Y02E 60/321; Y02E 60/324; Y02E 60/362; Y02E 60/364; H01M 8/04208; H01M 8/065; H01M 8/0606; C01B 3/04; C01B 3/065; F17C 11/005; B01J 7/00
See application file for complete search history.

(56) References Cited

U.S. PATENT DOCUMENTS

| | | | |
|---|---|---|---|
| 2,934,628 | A | 4/1960 | Masser et al. |
| 3,638,083 | A | 1/1972 | Dornfeld et al. |
| 3,763,454 | A | 10/1973 | Zandonatti |
| 4,047,143 | A | 9/1977 | Burden et al. |
| 4,107,759 | A | 8/1978 | Shirn et al. |
| 4,275,432 | A | 6/1981 | Napiorkowski |
| 4,351,806 | A * | 9/1982 | Galloway ................. 422/206 |
| 4,441,093 | A | 4/1984 | Okazaki |

(Continued)

FOREIGN PATENT DOCUMENTS

| | | |
|---|---|---|
| DE | 3533385 C1 | 4/1986 |
| WO | WO 2013/122849 A1 | 8/2013 |

OTHER PUBLICATIONS

European Patent Application No. 13764321.9; Partial Suppl. Search Report; dated Jul. 10, 2015; 7 pages.

(Continued)

*Primary Examiner* — Imran Akram
(74) *Attorney, Agent, or Firm* — Baker & Hostetler LLP (57) ABSTRACT

Disclosed herein is a method of producing hydrogen, including selectively applying heat to a fuel within a canister thermally insulated and inside a cartridge, firing fuel with heating elements to facilitate decomposition and release hydrogen, and, removing said hydrogen from said cartridge via a fluid communication means.

29 Claims, 7 Drawing Sheets

(56) References Cited

U.S. PATENT DOCUMENTS

| | | | |
|---|---|---|---|
| 4,486,804 A | 12/1984 | Watson et al. | |
| 4,527,144 A | 7/1985 | Arikawa | |
| 4,652,848 A | 3/1987 | Hundrieser | |
| 4,715,261 A * | 12/1987 | Goldstein et al. | 89/8 |
| 5,153,805 A | 10/1992 | Tennant et al. | |
| 5,192,937 A | 3/1993 | Lee | |
| 5,280,262 A | 1/1994 | Fischer | |
| 5,550,527 A | 8/1996 | Lee | |
| 5,563,570 A | 10/1996 | Lee | |
| 5,600,295 A | 2/1997 | Kaufmann | |
| 5,612,662 A | 3/1997 | Drekmeier et al. | |
| 5,708,553 A | 1/1998 | Hung | |
| 5,770,993 A | 6/1998 | Miyazawa et al. | |
| 5,831,507 A | 11/1998 | Kasamatsu et al. | |
| 5,896,080 A | 4/1999 | Chen | |
| 5,982,270 A | 11/1999 | Wolfe et al. | |
| 6,348,851 B1 | 2/2002 | Wyser et al. | |
| 6,445,277 B1 | 9/2002 | Ishikawa et al. | |
| 7,023,674 B2 | 4/2006 | Gross et al. | |
| 7,345,570 B2 | 3/2008 | Kawanishi | |
| 7,385,474 B2 | 6/2008 | Kawanishi | |
| 7,864,024 B2 | 1/2011 | Schlenker et al. | |
| 8,289,122 B2 | 10/2012 | Matthiesen et al. | |
| 2002/0155330 A1 | 10/2002 | Tanaka | |
| 2004/0146754 A1 | 7/2004 | Arthur et al. | |
| 2004/0214056 A1 | 10/2004 | Gore | |
| 2006/0273876 A1 | 12/2006 | Pachla et al. | |
| 2007/0036711 A1 * | 2/2007 | Fisher et al. | 423/648.1 |
| 2007/0243431 A1 | 10/2007 | Zhu et al. | |
| 2007/0277436 A1 | 12/2007 | Jones | |
| 2009/0001816 A1 * | 1/2009 | Tarter | 307/65 |
| 2010/0028751 A1 | 2/2010 | Kubota | |
| 2010/0033295 A1 | 2/2010 | Kent et al. | |
| 2010/0226829 A1 | 9/2010 | Horiguchi et al. | |
| 2010/0247425 A1 | 9/2010 | Scattergood et al. | |
| 2011/0177404 A1 * | 7/2011 | Hung et al. | 429/416 |
| 2012/0194315 A1 | 8/2012 | Matthiesen et al. | |
| 2012/0194958 A1 | 8/2012 | Matthiesen et al. | |

OTHER PUBLICATIONS

European Patent Application No. 13764160.1; Partial Supplementary Search Report; dated Nov. 3, 2015; 6 pages.

European Patent Application No. 13764321.9; Extended Search Report; dated Oct. 27, 2015; 13 pages.

* cited by examiner

HYDROGEN PRODUCING FUEL CARTRIDGE

CROSS-REFERENCE TO RELATED APPLICATIONS

This application claims priority benefit of U.S. Provisional Patent Application No. 61/615,077, filed on Mar. 23, 2012, and International Patent Application PCT/US2013/030263 filed Mar. 11, 2013, the contents of which is incorporated by this reference as if fully set forth herein, in their entirety.

BACKGROUND

1. Field

This disclosure relates to hydrogen producing fuel cartridges, and methods for producing hydrogen from these cartridges.

2. General Background

World-wide commercial use of fuel cell powered host devices, particularly portable devices. A non-exclusive list of potential host devices include, but are not limited to, computer peripherals, mobile phone peripherals, mobile phones, personal music players, laptops, notebooks, tablet, gaming devices, personal digital assistants (PDAs), and battery chargers. A fuel cell power system can either be located inside the host device or can be connected to the host device using suitable means. In either case, a means to provide fuel to the power system is required. An example of one such means is the use of fuels packaged in cartridges (packaged fuel) in predetermined amounts to satisfy the volume, weight and run time requirements of the host device, use profile of the host device, and regulatory requirements associated with the host device. For the sake of simplicity, a fuel cell power system is considered to comprise of a fuel cell subsystem that includes the fuel cell or a multiplicity of fuel cells in the form of a fuel cell stack, fluid, and power management means, a process controller, and the fuel cartridge. The fuel cartridge is connected to the fuel cell subsystem system using a connector or coupling.

To support commercialization, low-cost, user-friendly, methods for producing hydrogen on demand in a safe manner is needed. Hydrogen can be produced by hydrolysis of chemicals such as sodium borohydride. Fuel cartridges for producing hydrogen from sodium borohydride are disclosed in U.S. Pat. Nos. 7,794,886, 7,832,433, 7,896,934 and 8,002,853. Hydrogen production from hydrolysis is characterized by short start-up times and good control of hydrogen production rates. However, the need to use water or other aqueous solutions decreases the hydrogen storage capacity of these fuel cartridges. In addition, once activated to support a fuel cell system, hydrogen continues to evolve from these cartridges, requiring a buffer to store this hydrogen in the event the fuel cell system is shut-off.

Hydrogen may be produced via thermolysis of chemicals such as ammonia borane and alane (aluminum hydride). For example, US2010/0226829A1 describes a hydrogen generator that produces hydrogen by the decomposition of ammonia borane. In a thermolysis fuel cartridge, hydrogen is produced by supplying heat to the chemicals contained in the fuel cartridge.

Accordingly, it is a desideratum to develop designs, components and methods to improve thermal management and hydrogen production efficiencies in thermolysis fuel cartridges.

DESCRIPTION

According to some exemplary implementation of the disclosure, a thermolysis cartridge comprising a gas-tight enclosure with an external surface and an internal surface; a canister characterized by a wall that has an external surface, an internal surface, forming a cavity; a fuel in the cavity of the canister; a heating element with an electrical connection that extends from the external surface of said cartridge into the cavity of the canister and is in contact with said fuel; insulation in contact with the external surface of said canister and the internal surface of said gas-tight enclosure; and, wherein hydrogen gas is produced by heating to cause decomposition of fuel.

In some exemplary implementation of the disclosure, the thermolysis fuel includes at least one of alane and ammonia borane. In some exemplary implementation of the disclosure, the thermolysis fuel includes at least some inert materials to improve thermal conductivity including at least one of alumina and ceramics. In some exemplary implementation of the disclosure, the thermolysis is admixed with metal powders such as aluminum to improve thermal conductivity.

In some exemplary implementation of the disclosure, the thermolysis cartridge includes a fluid communication means wherein hydrogen may be output from the cartridge. In some exemplary implementation of the disclosure, the thermolysis cartridge heating element is a bendable element. In some exemplary implementation of the disclosure, the thermolysis cartridge heating element is discrete elements and in some instances the discrete elements are banked and one or more discrete elements are switched on/off for proportional control.

According to some exemplary implementation of the disclosure, a thermolysis cartridge comprising an enclosure with an external surface and an internal surface; a canister characterized by a wall that has an external surface forming a cavity; a fuel in the cavity of the canister; a heating element with an electrical connection that extends through the face of the enclosure and surrounds at least a portion of the canister; a hydrogen output port extending from the canister; insulation in contact with the external surface of the canister; and, wherein hydrogen gas is produced by heating to cause decomposition of fuel and output via a port In some exemplary implementation of the disclosure, the canister includes at least one of ceramics, plastics, laminates, foils, and metals. In some exemplary implementation of the disclosure the canister includes a manifold in fluid communication with the hydrogen output port. In some exemplary implementation of the disclosure the canister includes heat transfer members within the canister. In some instance the heat transfer members are fins. The fins, in some instance, extend radially from the center axis of the canister.

The fins, in some instances, extend inward from the annular wall towards the center axis of the canister. In some instances the heat transfer members are perforated plates placed inside the canister and orthogonal to the canister wall.

In some exemplary implementation of the disclosure, the canister includes compartmentalization of fuel within the canister. The compartmentalization may be accomplished via one or more of fins, perforated plates inside the canister and placed orthogonal to the canister wall. In some instance the disclosure provides discrete heating of compartmentalization of fuel within the canister.

In some exemplary implementation of the disclosure, heating element has local switchable regions. In some instances discrete heating elements are banked and one or more discrete elements are switched on/off for proportional control.

In some exemplary implementation of the disclosure, the thermolysis fuel includes at least one of alane and ammonia borane. In some exemplary implementation of the disclosure, the thermolysis fuel includes at least some inert materials to improve thermal conductivity including at least one of alumina and ceramics.

According to some exemplary implementation of the disclosure, there is a thermolysis hydrogen fuel cartridge comprising: an enclosure; an encasement and an internal surface; a vacuum insulation forming a cavity which is substantially impermeable to hydrogen; a fuel in the cavity; a heating element within the cavity; a face plate forming the cartridge when affixed to the encasement; A communications ribbon extending through an aperture in the face plate in conductive communication with the heating element; and, fluid communication means whereby hydrogen gas is produced by heating to cause decomposition of fuel is output.

All callouts in the attached figures are hereby incorporated by this reference as if fully set forth herein.

It should be appreciated that, for simplicity and clarity of illustration, elements shown in the figures have not necessarily been drawn to scale. For example, the dimensions of some of the elements are exaggerated, relative to each other, for clarity. Further, where considered appropriate, reference numerals have been repeated among the Figures to indicate corresponding elements. While the specification concludes with claims defining the features of the present disclosure that are regarded as novel, it is believed that the present disclosure's teachings will be better understood from a consideration of the following description in conjunction with the figures, in which like reference numerals are carried forward. All descriptions and callouts in the figures are hereby incorporated by this reference as if fully set forth herein.

FURTHER DESCRIPTION

Devices, including but not limited to PEM fuel cells require hydrogen fuel to generate electricity. Hydrogen can be stored as-is or can be produced on demand. In certain applications, it is useful to have replaceable hydrogen supplies which may be supplied as pressurized gas in tanks (also known as a container, tank, canister or cartridge) or hydrogen stored in metal hydrides, in slurries or in other substrates. Hydrogen may also be supplied in the form of a precursor chemical in the form of a chemical hydride. The latter is particularly suited for portable power system whereby the chemical stored in the tank is reacted using suitable methods, as needed, to produce hydrogen on-demand.

High purity hydrogen is preferred when used in a PEM fuel cell. Purity above 99% is preferred. Hydrogen above about 99.9% purity is more preferred and hydrogen above about 99.99% purity is most preferred. Assuring proper purity of hydrogen is important as impurities in a hydrogen fuel supply may damage or degrade the performance of the PEM fuel cell. Deterring the use of an unauthorized or unauthenticated hydrogen fuel source is one means of insuring that the end user can rely on the stable and production of power from a PEM fuel cell system. This also enables monitoring and disposal of counterfeit hydrogen supplies.

Figure 1:
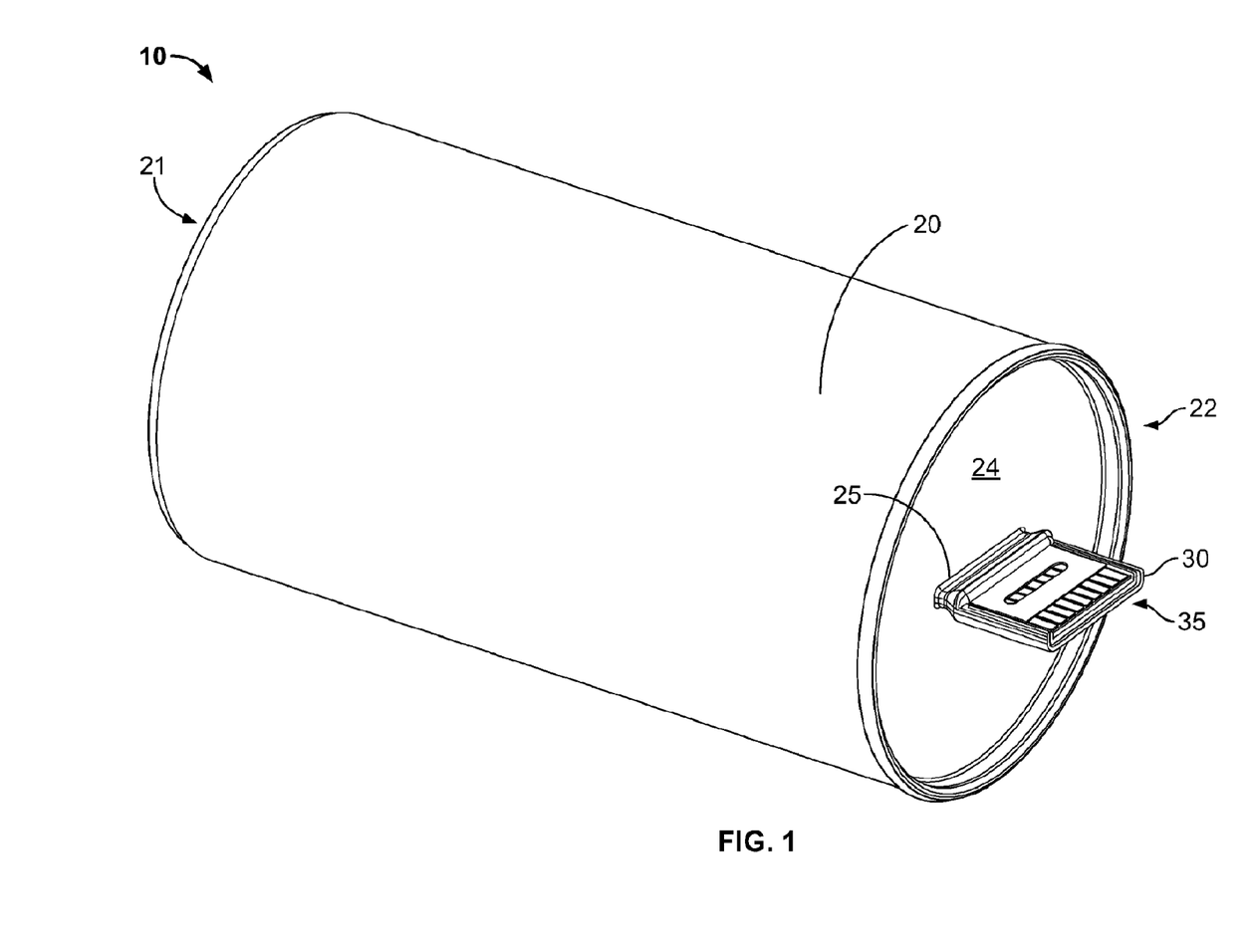
FIG. 1 is a perspective view of an exemplary thermolysis fuel cartridge.
Figure 2:
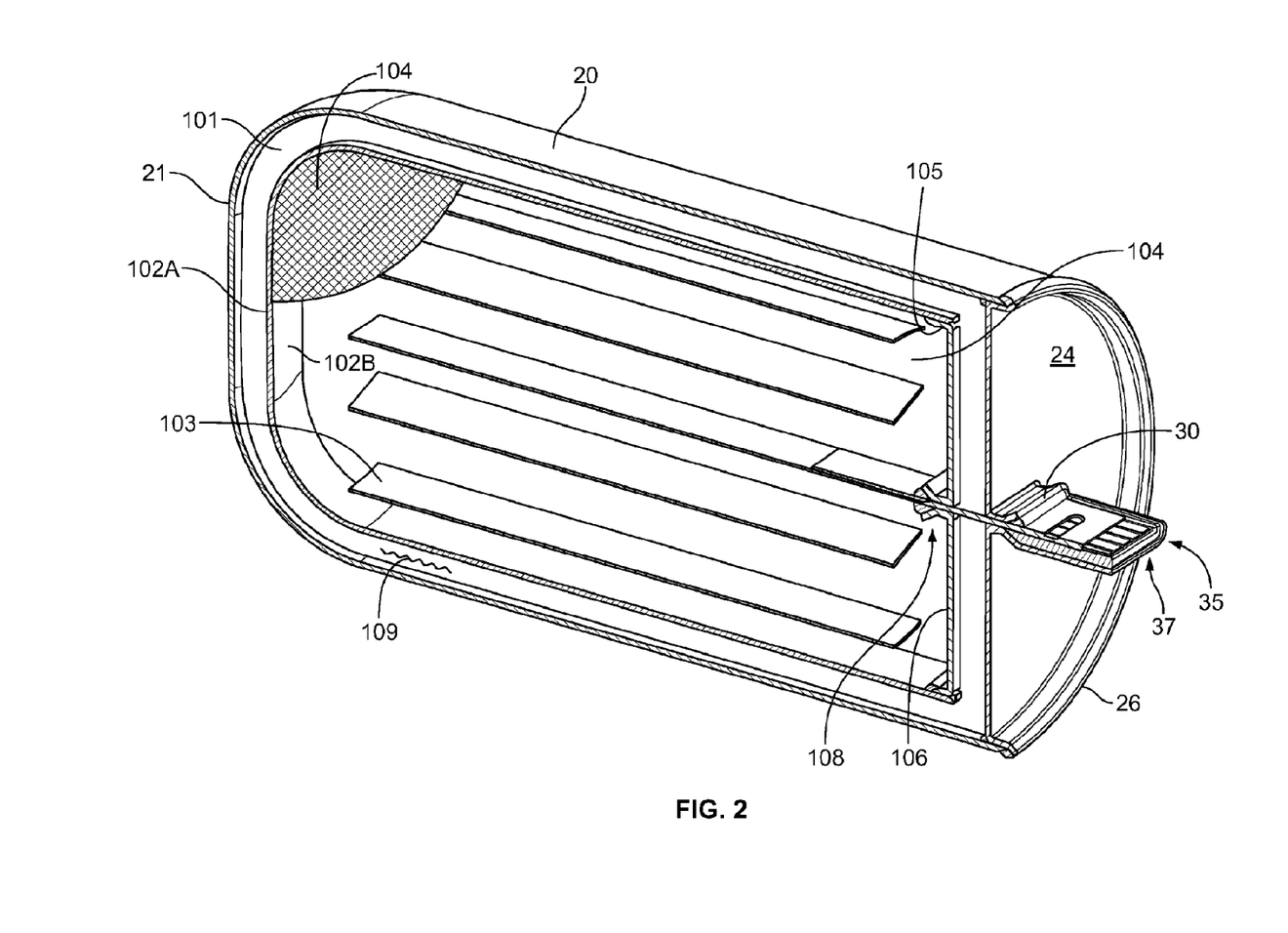
FIG. 2 is a cross sectional view of an exemplary thermolysis fuel cartridge showing a partial area of fuel.

FIGS. 1 and 2 illustrate aspects of a hydrogen fuel cartridge 10 having a substantially hollow body 20 (also referred to as a container), a closed back end 21 and a partially closed front end 22. Said cartridge contains fuel. The face 24 of the front end has an aperture 25 wherein communication with the interior of the cartridge takes place. The cartridge is substantially impermeable to hydrogen leakage at a preselected pressure. Said cartridge may be lined or unlined. Said cartridge has at least one dispensing end 30 which is fitted with a fluid communication means 35 such as a valve, membrane, frangible barrier valve and the like and an electrical input means 37 such as a resistive element via an aperture 25. The electrical means provide power to heating elements and thermoregulation elements. The fluid communication means provides a pathway to obtain hydrogen produced via decomposition of said fuel.

In some exemplary implementations, inside the hollow body 20 is a thermolysis fuel containing canister. The canister may be made of molded plastic or aluminum or any other light weight material that is not reactive with the fuel. The dispensing end 30 provides fluid communication 35 means and an electrical input means 37 (see FIG. 7 for greater detail on such fluid communication means). In some instance at least some of the space between the body 20 and the canister maybe filled insulation 101 such as form-fit vacuum insulation. The canister 102A contains the thermolysis fuel 104 and resistive heating elements 103. The fuel 104 is in powdered form and is packed into the canister 102. Alternately, the fuel can be in pre-fabricated form to fit the dimensions of canister 102A within the interior wall 102B of the canister, or could be in the form of particles or pellets.

Exemplary thermolysis fuels are ammonia borane and alane. $AlH_3$ or alane thermally decomposes at 110° C. to 160° C. to yield hydrogen and aluminum. The material based hydrogen capacity 10 wt. %. Alane is stable at room temperature. The decomposition of alane to hydrogen is endothermic, which simplifies control and safety. A thermolysis cartridge 10 containing alane may be characterized by hydrogen storage capacities of 5-6 wt.-%. The volumetric density could approach 1050 W-hr./l. A fuel cell system that uses these cartridges to supply hydrogen is therefore characterized by specific energy and energy density that is 2-3× better than primary batteries.

The insulation 101 between can be a fit-to-form pre-fabricated vacuum insulation panel. Exemplary insulation panels include those supplied by Nanopore, Inc. (Albuquerque, N.Mex.). Vacuum insulation panels are made by sealing insulating materials generally consisting of silica and carbon in a suitable barrier under vacuum. At <10 mbar vacuum, these vacuum insulation panels offer an R value/inch of >30 allowing for compact and lightweight thermolysis fuel cartridges. The use of these panels eliminates the need for enclosing the heating element 103 and fuel 104 in a thin walled vacuum flask or dewar or vessel. Instead, canister 102A is made of simple molded plastic or aluminum or a light weight material. In some instances, depending on the intended use and performance variables or as a matter of design choice, the insulation may be added as a particulate into the interior space of the cartridge. This includes, but is not limited to areas surrounding the heating elements 103 and at least a portion of the region 109 between the outer wall of the interior canister or vessel and the inner wall of the cartridge.

Sealing the face 24 to the canister 102A may include crimping the edges 105 of the front cover 106 onto the canister with the fuel and heating element(s) in place, and secured communication with the interior of the cartridge takes place. The dispensing end 30 provides fluid communication means and an electrical input means (see FIG. 7 for greater detail on such fluid communication means and electrical input means) which passes into the canister 102 via an aperture 108 formed therein. Within the crimp an adhesive or boundary such as a silicon sealant may be added. The same approach may be employed for sealing the face 24 to the hollow body 20 when the canister and insulation are in place. Vacuum insulation should be evacuated before, during or after the face 24 is crimped 26 in place.

Figure 3:
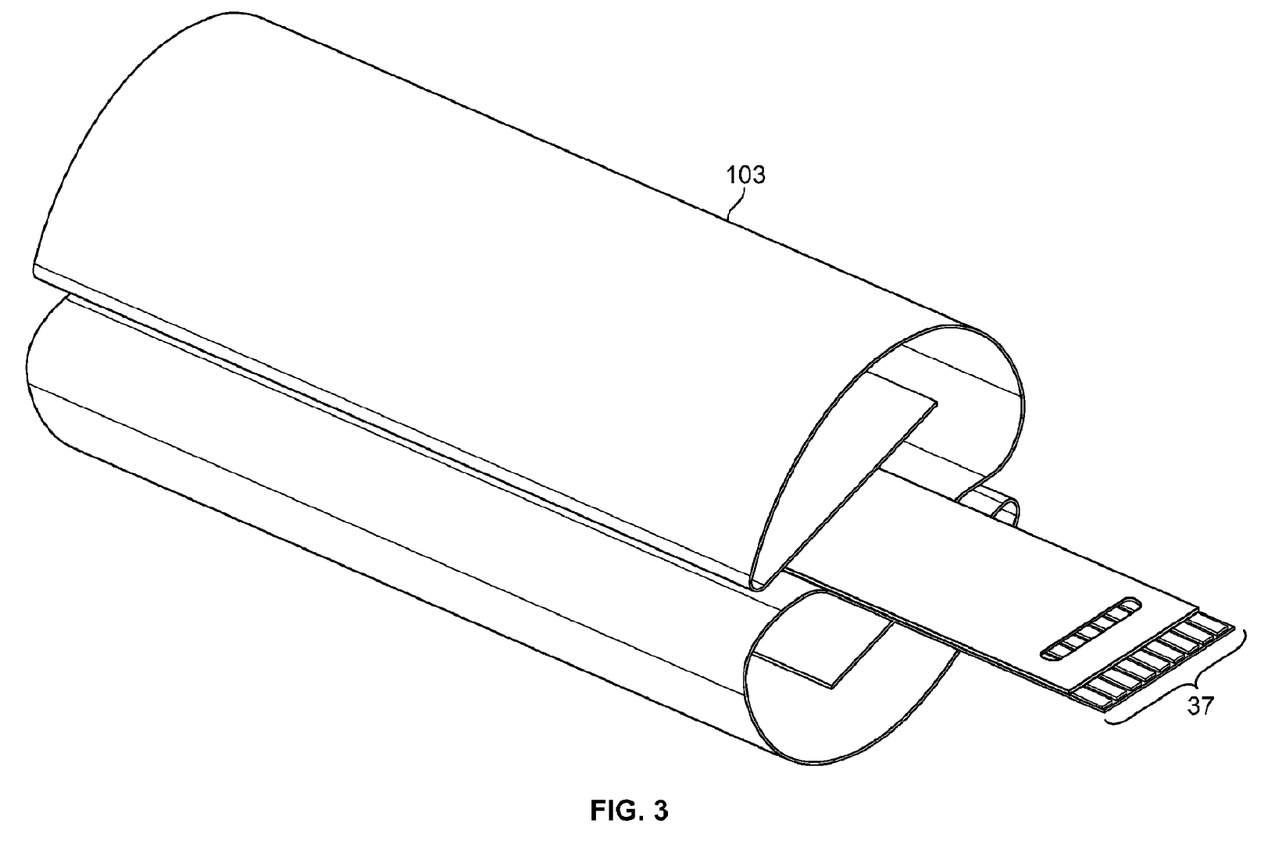
FIG. 3 is a view of a flexible heating element for use in a thermolysis fuel cartridge.

FIG. 3 illustrates one exemplary implementation of a heating element 103 and an associated an electrical input means 37. Heating elements (which may also be referred to as heaters) such as the exemplar shown in FIG. 3 and others described below in this disclosure, for simplicity, are shown as a single resistive element. Such an element may be bendable to conform to a cylindrical or other shape. However, that simplification is not a limitation. Heaters may have multiple discrete elements which can be used to permit the control of heat output from different areas of the heater. The discrete heaters could be banked and one or more discrete element then switched on/off for proportional control. Either a single heating element or multiple heating elements may be simple on/off whereby the entire element heats or may have localized regions (such as resistance heaters formed or printed thereon) which are switched on/off in series or in parallel. If in parallel the switching algorithm may switch contiguous local regions or non-contiguous local regions or a combination.

Heat needs to be supplied to a thermolysis cartridge to produce hydrogen via decomposition of the fuel, and methods to reduce start-up time are required to enable commercialization. Heat required for start-up (to heat-up the fuel from ambient temperature to 100-170° C.) can be produced by supplying power to a resistive heating element. In some instances a battery may be used to supply this power. This however impacts the number of start-ups that can be accomplished using the fuel cell system hybridized with a battery, and adds to the cost of the system. In addition, the thermolysis fuels are characterized by poor thermal conductivity, and packing the fuels in powdered form into a canister containing a heating element outside is likely to be characterized by poor thermal efficiencies and subsequently poor hydrogen production efficiencies.

In some exemplary implementations, the fuel in powdered form is admixed with inert materials such as alumina or other ceramics to improve thermal conductivity. As an alternative, the fuel is admixed with metal powders such as aluminum to improve thermal conductivity. This allows more uniform heat distribution and maximizes conversion of the fuel to hydrogen.

In some exemplary implementations, the fuel powders either in native form or in admixed form is compacted into tablet or pellet form. These tablets or pellets can be fired using dedicated heating elements as needed to produce hydrogen.

In some exemplary implementation of a thermolysis cartridge 300 (FIG. 4), the heating element 303 contacts the external wall of the canister 302 containing the thermolysis fuel on one side, and is enclosed by the vacuum insulated panel 301 on the other side. Hydrogen is removed via port 306. The location of this port is shown as an example only. The port can be suitably combined with the electrical input connection, and or input-output (I/O) functions and a fluid communications means (i.e. a pathway or manifold) to provide a single fluidic and electrical connection between the cartridge and the exterior. In some instances that exterior is a connection to a hydrogen utilizing system such as a fuel cell power system.

Figure 4:
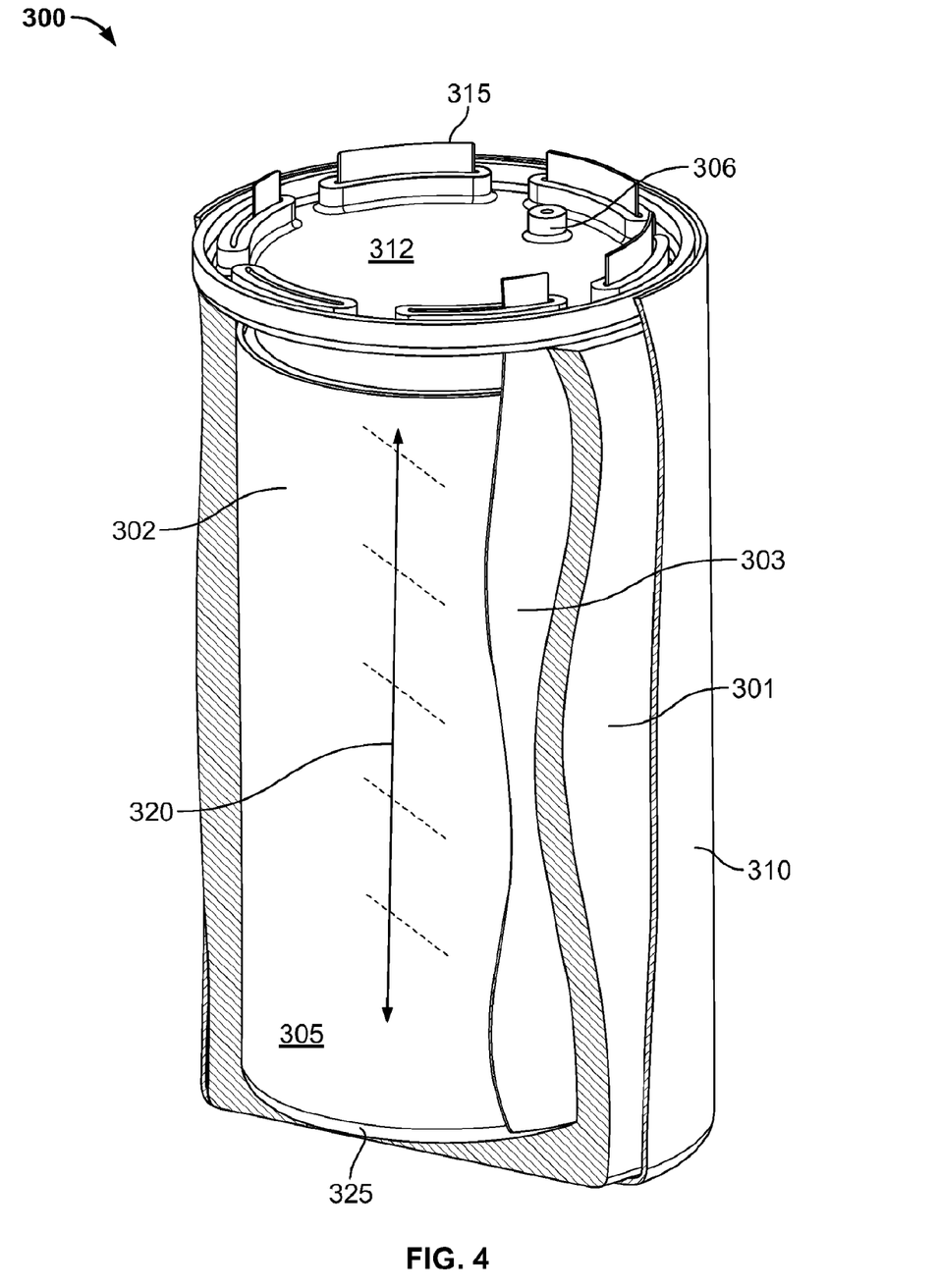
FIG. 4 is a cut-out view of a cylindrical thermolysis fuel cartridge.

In cartridge 300, there is an outer enclosure 310 with a face cover 312 and within said enclosure canister 302 made of a material which is lightweight and substantially impermeable to hydrogen leakage with appropriate thermal properties which may include ceramics, plastics, laminates, foils, and metals such as aluminum that have high thermal conductivity to facilitate high heat transfer rates from the outer canister wall to the fuel inside the canister. The inside of the canister may be referred to as a cavity, volumetric space or container. Heating elements 303 may have contacts 315 extending through the face 312 whereby heating power and control (via a system or thermal controller not shown) may be applied. There may be a single heating element 303 or multiple elements. Either a single heating element or multiple heating elements may be simple on/off whereby the entire element heats or may have localized regions (such as resistance heaters formed or printed thereon) which are switched on/off in series or in parallel. If in parallel the switching algorithm may switch contiguous local regions or non-contiguous local regions or a combination.

In some instances, if the fuel is in powdered or particle form, heat transfer rates are enhanced by packing the fuel in porous metal or ceramic substrates such as foams or felts that are fit into the canister 302. Although not shown, those of ordinary skill in the art will recognize that heat transfer may be enhanced by adding heat transfer members such as fins to at least one of one of the heating element and the canister. For example, fins may be extended radially from the center axis 320 of the canister towards the canister wall or radially from the canister wall to the center axis 320 of the canister. The canister wall is an annular wall that surrounds a canister base 325. The canister is either fabricated with the fins as part of the interior of the wall and/or base or the fins are separate and maybe inserted into the canister wall. In some instances, contact may be supported by utilizing pre-cut grooves in the canister walls and attaching a finned insert into the canister. Centralized fins may be used to compartmentalize the inside of the canister regardless of whether thermal control or enhancement is obtained or sought. Compartmentalization may also be utilized to provide separate heating elements in each compartment and each of which are separately actuatable for on/off thereby limiting the fuel being heated to that in a compartment. The thermolysis fuel powder or particles in native or admixed form is filled in the space between the fins.

Compartmentalizing the inside of the canister also may improve hydrogen removal from the canister to the point of use. The channeling or mal-distribution of gas flow is avoided in case the particles or powders settle as a result of the reaction. In addition, uneven, or undesirable pressurization of the canister due to possible sintering of the particles may be reduced.

Using discrete pellets or tablets is another form of compartmentalizing hydrogen production and removal from the canister to the point of use. In this implementation, the use of heat transfer features inside the canister may not be necessary.

Figure 5:
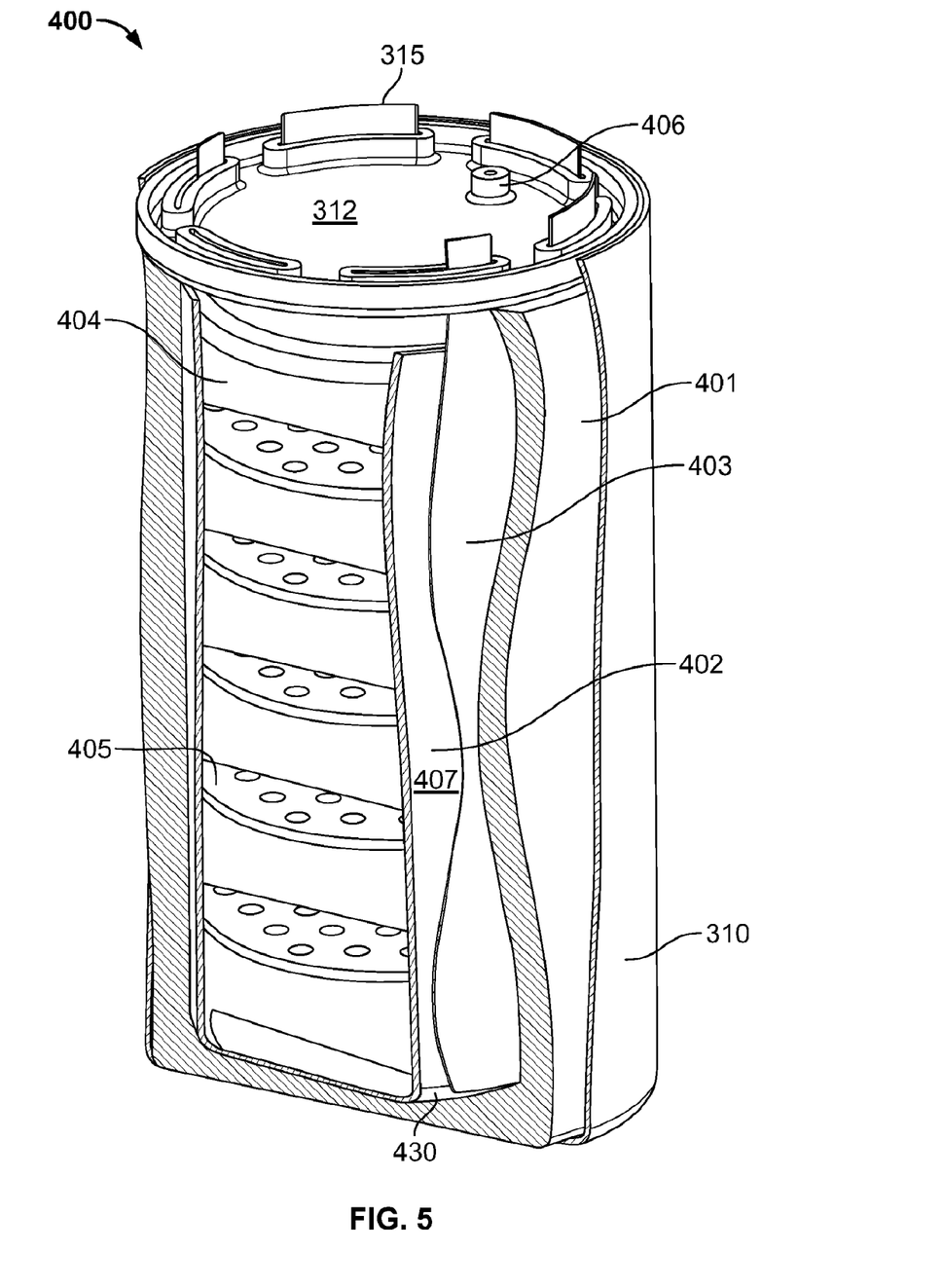
FIG. 5 is a cut-out view of a cylindrical thermolysis fuel cartridge showing compartmentalized features.

In another implementation of a thermolysis fuel cartridge 400 (FIG. 5), a heating element 403 contacts the outer (exterior) wall of the canister 402 on one side and the vacuum insulation panel 401 on the other side. The heating element may be simple on/off or it may have regions that are separately controlled whereby local areas of a heating element (such as resistance heaters) are switched on/off. The switching may correspond to compartmentalized areas of the fuel whereby a selected portion of the fuel may be heated to decomposition and hydrogen production. Compartmentalization of the fuel 404 inside the canister may be achieved using fins as described above, dividers or perforated plates. In some exemplars perforated plates 405 that are a snug fit with the interior (not visible) of the annular walls 407 of the canister 402. The plates 405 may be placed generally orthogonal to the annular wall. The annular wall surrounds a base 430. These plates may facilitate heat transfer from the wall to the fuel inside the canister and the removal of hydrogen produced to the point of use via port 406. A manifold or chamber may be contiguous with port 406. The fuel 404 is in the form of powders, particles, pellets or tablets and is in native or admixed form.

In some aspects of exemplary implementations of a thermolysis fuel cartridge 500 (FIG. 6), the thermolysis fuel 501 may be contained in a cavity 600 formed by the vacuum insulation 502 itself. That is, there is no internal canister in this implementation. Utilizing insulation 502 substantially impermeable to hydrogen gas can serve this role. The heating element 503 is located within the thermolysis fuel 501.

Figure 6:
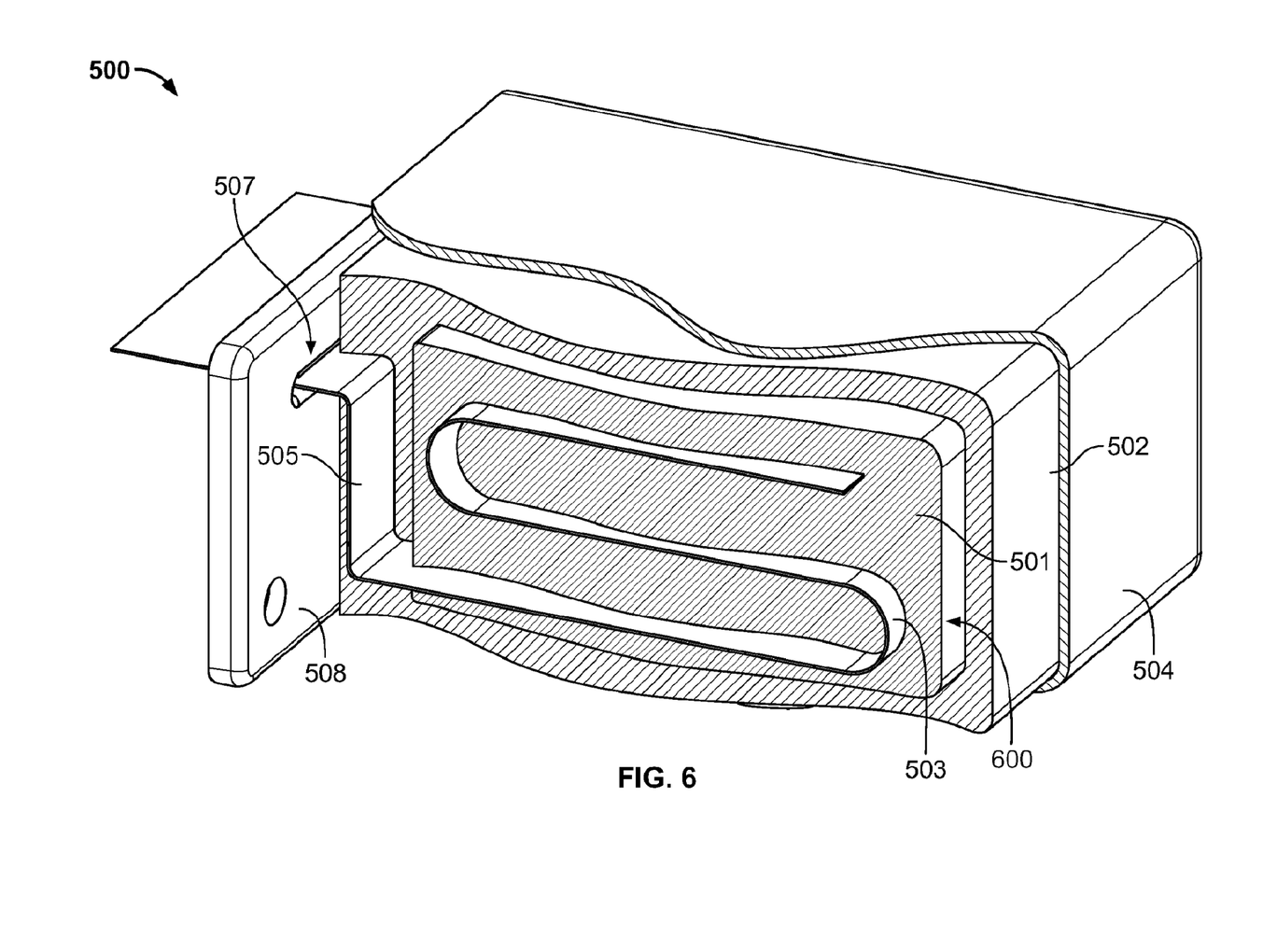
FIG. 6 is a cut-out view of a thermolysis fuel cartridge that does not contain an internal canister.

Elimination of an internal canister has the potential to reduce the fabrication cost of the cartridge 500. The elimination of the internal canister removes a resistance element to heat transfer and has the potential to increase heat transfer rates and hydrogen generation efficiencies. Shown in FIG. 6 is an encasement 504 which may be placed around the insulation fuel components and affixed to a cover or face plate.

A communications ribbon 505 with electrically conductive strips of regions is both connected to the heating element and extends from the cartridge through an aperture 507 in a face plate 508. Although not shown, fluid communication to obtain hydrogen released from firing the fuel may be combined with the aperture, or the aperture may be sealed against hydrogen leakage and a spate vent, manifold, port or communication pathway may be added to the cartridge.

Figure 7:
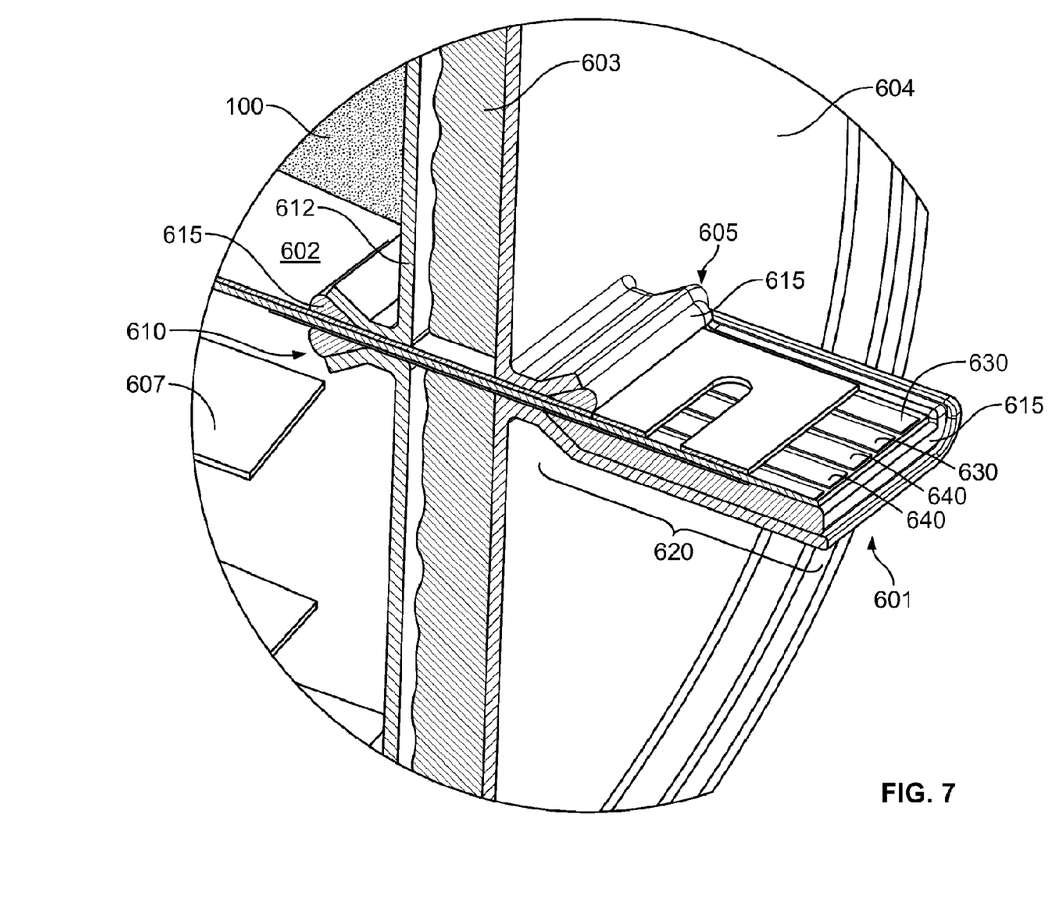
FIG. 7 is a detail of a communications member extending through an aperture.

FIG. 7 illustrates details of communication between a system and/or power supply and the heating element and any controllers associated therewith or thereon. In some exemplary implementations such as those shown in FIGS. 2 and 6, aperture provided may have dual function of electrical communication and fluid communication for hydrogen. Disclosed herein is an extended interface member 601 communicating with a conductive ribbon or strip 602 from the heating element (forming a fluid communication means and a power supply means), which may be surrounded in part by insulation 603 to reduce thermal losses, extends through the cartridge face 604 via an aperture 605. The canister containing the heating elements 607 fuel 100 and having a fluid pathway to dispense hydrogen may be a sealed vessel or a sealed insulation body. In those instances wherein the canister is a sealed vessel, a rearward aperture 610 is formed in a canister wall 612. An adhesive, gasket, or the like such as a high temperature silicone based adhesive 615 is disposed around the communications apertures 605/610 to limit hydrogen leakage to a negligible amount.

The interface member 601 is shown integral to an aperture. Aperture 605 is asymmetrical having an extended lower lip 620. Tracks that provide communications and power functions such as thermocouple 630 and heating power 640 may be provided. A hydrogen pathway may also be integrated in same, wherein pathways for hydrogen flow are provided along with said track. Digital or analog communication pathways may also be added to the interface akin to a USB or other power and input/output jack or protocol for communicating with switches or controller associated with the heating elements.

The thermolysis cartridge implementations described herewith are not limited to the particular geometries shown in the figures. It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the invention both independently and as an overall system and in both method and apparatus modes.

In the case of alane fuel, decomposition yields high purity hydrogen gas leaving behind aluminum as the byproduct. In the case of ammonia borane however, the hydrogen gas may contain trace levels of contaminants such as borazine and ammonia. Contaminants should be removed from the hydrogen gas prior to feeding into the fuel cell system. Contaminant removal is accomplished by using suitable filter or adsorbent materials such as activated carbon. Filter materials can be enclosed in a suitable space in the fuel cartridge. For example, the filter material can be contained in an enclosure that is located between the vacuum insulation and the gas-tight enclosure of the cartridge. Filters to remove contaminants are not required for alane. When the fuel is in the form of powders, certain powder traps in the form of a gauze or mesh or wool can be used to trap powders entrained in the hydrogen gas.

As described previously, the electrical power required to bring the cartridge to temperature from ambient is a drawback of thermolysis fuel cartridges. In one implementation, the cartridge is initially heated by the reaction heat produced by the hydrolysis of a sacrificial chemical including but not limited to calcium oxide. In this implementation, an enclosure containing this chemical is placed between the vacuum insulation and the external surface of the canister. The reaction is triggered by the addition of water contained in the enclosure using suitable means.

While the method and devices have been described in terms of what are presently considered to be the most practical, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure also includes any and all implementations of the following claims.

Further, each of the various elements of the disclosure and claims may also be achieved in a variety of manners. This disclosure should be understood to encompass each such variation, be it a variation of an implementation of any apparatus implementations, a method or process implementations, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element, disclosed, should be understood to encompass a disclosure of the action which that physical element facilitates.

Any patents, publications, or other references, mentioned in this application, for patent, are hereby incorporated by reference. In addition, as to each term used, it should be understood that, unless its utilization in this application is inconsistent with such interpretation, common dictionary definitions should be understood, as incorporated, for each term, and all definitions, alternative terms, and synonyms such as contained in at least one of a standard technical dictionary recognized by artisans and the Random House Webster's Unabridged Dictionary, latest edition, are hereby incorporated by reference.

Finally, all references, listed in the Information Disclosure Statement or other information statement filed with the application, are hereby appended and hereby incorporated by reference; however, as to each of the above, to the extent that such information or statements incorporated by reference might be considered inconsistent with the patenting of this/these invention(s), such statements are expressly not to be considered as made by the applicant(s).

In this regard, it should be understood that, for practical reasons, and so as to avoid adding potentially hundreds of claims, the applicant has presented claims with initial dependencies only.

Support should be understood to exist, to the degree required under new matter laws,—including but not limited to United States Patent Law 35 USC 132 or other such laws,—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular exemplary implementations, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative exemplary implementations.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A thermolysis hydrogen fuel cartridge comprising:
a gas-tight enclosure with a first external surface (20/21/22) and a first internal surface;
a canister (102A) disposed within the gas-tight enclosure and characterized by a wall that has a second external surface and a second internal surface (102B), forming a cavity;
a fuel (104/501) in the cavity of the canister;
vacuum insulation (101) in contact with the external surface of said canister and the internal surface of said gas-tight enclosure;
a heating element (103) with an electrical connection (37) that extends from the external surface of said cartridge (24) through the vacuum insulation into the cavity of the canister and is in contact with said fuel;
wherein the heating element is configured to heat said fuel and cause decomposition of said fuel to produce hydrogen gas.

2. The thermolysis hydrogen fuel cartridge of claim 1, wherein said fuel includes at least one of alane and ammonia borane.

3. The thermolysis hydrogen fuel cartridge of claim 1, wherein said fuel includes at least some inert materials to improve thermal conductivity including at least one of alumina and ceramics.

4. The thermolysis hydrogen fuel cartridge of claim 1, wherein said fuel is admixed with metal powders such as aluminum to improve thermal conductivity.

5. The thermolysis hydrogen fuel cartridge of claim 1, further comprising a fluid communication means (35) wherein hydrogen may be output from the cartridge.

6. The thermolysis hydrogen fuel cartridge of claim 1, wherein said heating element is a bendable element.

7. The thermolysis hydrogen fuel cartridge of claim 1, wherein said heating element is discrete elements.

8. The thermolysis hydrogen fuel cartridge of claim 6, wherein said discrete elements are banked and one or more discrete elements are switched on/off for proportional control.

9. A thermolysis hydrogen fuel cartridge comprising:
an enclosure (310/312) with a first external surface (310) and a first internal surface;
a canister (302/402) disposed within the gas-tight enclosure and characterized by a wall that has a second external surface (305/407) forming a cavity;
a fuel (104/404) in the cavity of the canister;
vacuum insulation (301/401) in contact with the external surface of the canister;
a heating element (303/403) with an electrical connection (315) that extends through the face (312) of the enclosure and the vacuum insulation and surrounds at least a portion of the canister;
a hydrogen output port (306/406) extending from the canister; and,
wherein the heating element is configured to heat said fuel and cause decomposition of said fuel to produce hydrogen gas and output the produced hydrogen gas via the hydrogen output port.

10. The thermolysis hydrogen fuel cartridge of claim 9, wherein the canister includes at least one of ceramics, plastics, laminates, foils, and metals.

11. The thermolysis hydrogen fuel cartridge of claim 9, wherein said fuel includes at least one of alane and ammonia borane.

12. The thermolysis hydrogen fuel cartridge of claim 9, wherein said fuel includes at least some inert materials to improve thermal conductivity including at least one of alumina and ceramics.

13. The thermolysis hydrogen fuel cartridge of claim 9, further comprising a manifold within the canister and in fluid communication with the hydrogen output port.

14. The thermolysis hydrogen fuel cartridge of claim 9, further comprising heat transfer members within the canister.

15. The thermolysis hydrogen fuel cartridge of claim 14, wherein the heat transfer members are fins.

16. The thermolysis hydrogen fuel cartridge of claim 15, wherein the fins extend radially from the center axis (320) of the canister.

17. The thermolysis hydrogen fuel cartridge of claim 15, wherein the fins extend inward from the annular wall (305/407) towards the center axis of the canister.

18. The thermolysis hydrogen fuel cartridge of claim 14, wherein the heat transfer members are perforated plates (40) placed inside the canister and orthogonal to the canister wall.

19. The thermolysis hydrogen fuel cartridge of claim 14, further comprising compartmentalization of fuel within the canister.

20. The thermolysis hydrogen fuel cartridge of claim 19, further comprising discrete heating of compartmentalization of fuel within the canister.

21. The thermolysis hydrogen fuel cartridge of claim 20, wherein the compartmentalization is accomplished via perforated plates (40) inside the canister and placed orthogonal to the canister wall.

22. The thermolysis hydrogen fuel cartridge of claim 20, wherein the compartmentalization is accomplished via fin within the canister.

23. The thermolysis hydrogen fuel cartridge of claim 9, wherein said heating element has local switchable regions.

24. The thermolysis hydrogen fuel cartridge of claim 23, wherein said discrete elements are banked and one or more discrete elements are switched on/off for proportional control.

25. A thermolysis hydrogen fuel cartridge comprising:
   an encasement (504) affixed to a face plate (508) to form a cartridge enclosure;
   a vacuum insulation (502) disposed within the enclosure and forming a cavity (600) which is substantially impermeable to hydrogen;
   a fuel (501) in the cavity;
   a heating element (503) within the cavity;
   a communications ribbon (505) extending through an aperture (507) in the face plate and the vacuum insulation, said communications ribbon being in conductive communication with the heating element; and,
   a fluid communication means whereby hydrogen gas is output;
   wherein the heating element is configured to heat said fuel and cause decomposition of said fuel to produce hydrogen gas.

26. The thermolysis hydrogen fuel cartridge of claim 23, wherein said fuel includes at least one of alane and ammonia borane.

27. The thermolysis hydrogen fuel cartridge of claim 23, wherein said fuel includes at least some inert materials to improve thermal conductivity including at least one of alumina and ceramics.

28. The thermolysis hydrogen fuel cartridge of claim 25, wherein said heating element has local switchable regions.

29. The thermolysis hydrogen fuel cartridge of claim 28, wherein said discrete elements are banked and one or more discrete elements are switched on/off for proportional control.

* * * * *